Figure 2:
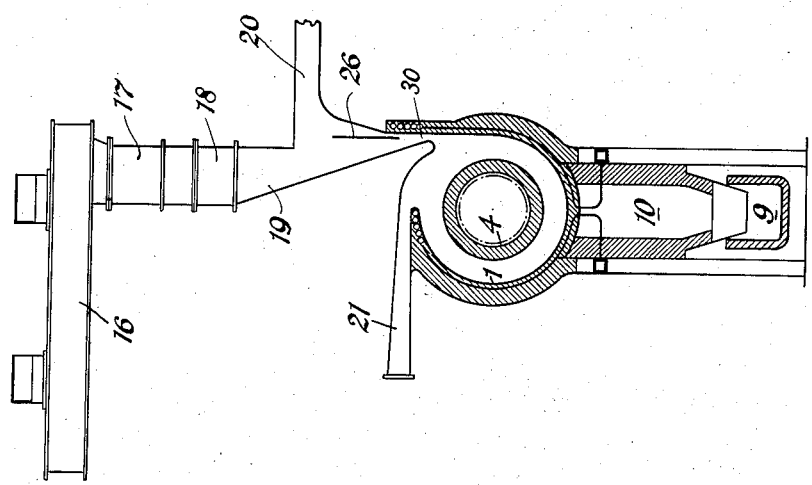

April 14, 1959

O. LOTZ 2,881,720

CYCLONE FURNACES

Filed June 19, 1951

INVENTOR
*Otto Lotz*
BY
*J. P. Moran*
ATTORNEY

United States Patent Office 2,881,720
Patented Apr. 14, 1959

2,881,720

CYCLONE FURNACES

Otto Lotz, Oberhausen, Germany, assignor to The Babcock & Wilcox Company, Rockleigh, N.J., a corporation of New Jersey Application June 19, 1951, Serial No. 232,413

Claims priority, application Germany June 21, 1950

2 Claims. (Cl. 110—28)

The present invention relates to the construction and operation of cyclone furnaces for burning ash-containing solid fuels in a relatively coarsely pulverized or granular condition at furnace chamber temperatures above the ash fusion temperature to thereby permit the removal of the incombustible ash residue from the furnace chamber as a liquid slag, and more particularly to furnaces of the character described in which the gaseous products of combusion are discharged from the furnace chamber adjacent the point of entry of the combustible mixture of fuel and air.

The granular fuels normally used in such furnaces have particle sizes of ⅜" and under, and contain as a result of the fuel crushing operation a proportion of dust-like particles, known as "fines." The fuel and air mixture is introduced in the combustion chamber through a tangential inlet arranged to effect a whirling motion of the fuel and air mixture in a helical path axially of and toward the opposite end of the furnace. In operation the entering fuel and air stream is rapidly ignited and the centrifugal effect of the whirling stream causes the ash particles released from the burning fuel particles to deposit in a molten condition on the furnace wall and form a film or layer of molten slag thereon on which the larger fuel particles are caught and burned.

In a copending application of A. Sifrin, Serial No. 202,981, filed Dec. 27, 1950, now Patent No. 2,717,563, the granulated fuel and air stream is introduced tangentially of a cylindrical portion of the combustion chamber around a concentric gas outlet throat and flows rearwardly in a helical path into a frusto-conical section before reversing and flowing forwardly to the gas outlet throat. The axis of the furnace chamber is approximately horizontal to promote a flow of the excess slag in the chamber to a slag outlet in the bottom of the forward cylindrical section. With this relative arrangement of the slag outlet and fuel inlet, there is the possibility of a fuel loss through the slag outlet.

In accordance with the present invention, the furnace chamber is tilted so that its axis extends outwardly and downwardly to provide a flow of the excess slag to a slag outlet in the cylindrical chamber section at or adjacent its juncture with the frusto-conical section, while the fuel is introduced tangentially into the cylindrical section at a point adjacent to the front wall of the chamber. This arrangement provides a long flame path for the fuel particles in the furnace chamber, while assuring that a minimum amount of fuel will be lost through the slag outlet.

With prior cyclone furnaces, the slag is discharged into a secondary combustion chamber, and flows, together with the slag separating in that zone, to the ash-removing provisions. In starting-up, therefore, there exists the danger that the slag will solidify in the secondary combustion chamber slag outlet unless the latter is intensely preheated. According to the present invention, both of the slag discharge openings empty into a common hermetically-sealed space. Owing to the high pressure drop existing between the cyclone furnace and the secondary combustion chamber, a stream of hot gases will stream through this space, and intensely heat the two slag discharge openings.

In order to achieve as complete combustion as possible in the cyclone chamber, so that fuel will not be lost in the slag discharge, there are disposed alongside of the fuel admission regulable, tangentially-discharging secondary-air nozzles, and the fuel is introduced between two tangent air streams.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 1:
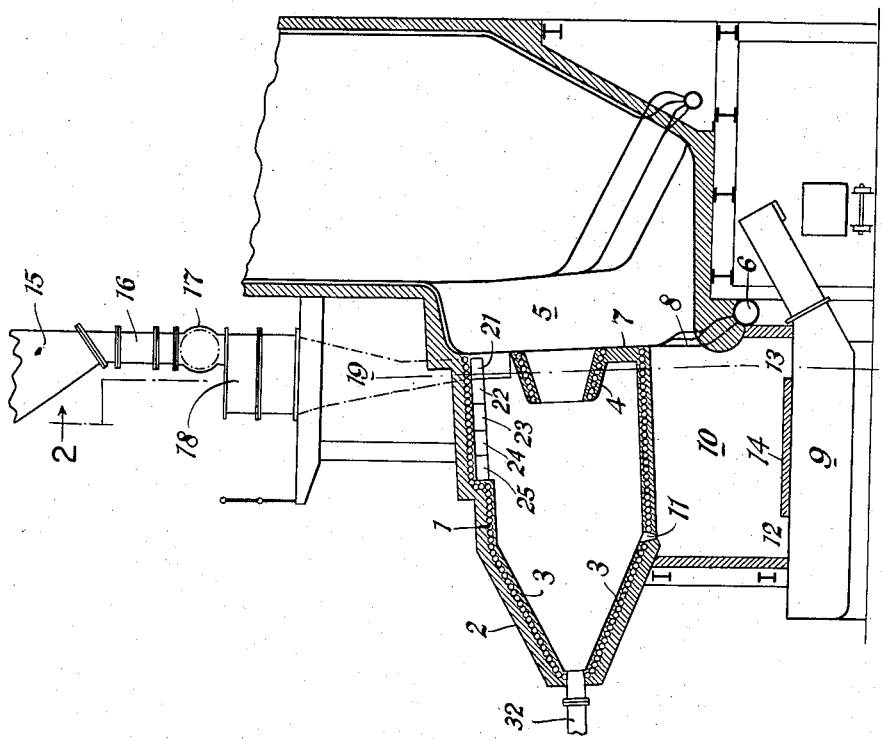

Of the drawings:

Fig. 1 is a somewhat diagrammatic sectional elevation of a horizontally arranged cyclone furnace constructed in accordance with my invention, and the adjacent portion of an associated water tube steam boiler; and Fig. 2 is a vertical section taken on the line 2—2 of Fig. 1.

As shown in the drawings, the combustion chamber of the cyclone furnace illustrated has a substantially cylindrical portion 1 arranged with its axis horizontally inclined outwardly and downwardly and having a tangentially arranged inlet 30 for supplying a combustile mixture of granular fuel and primary combustion air thereto. The combustion chamber also includes a rearwardly tapering frusto-conical section 2 extending rearwardly from the section 1. At the front end of the combustion chamber is arranged a concentric gas outlet defined by a forwardly flaring throat member 4 extending normal to the combustion chamber front wall and opening at its front end into a secondary combustion chamber 5 of an associated water tube type steam boiler. The secondary combustion chamber side of the front wall is covered with water tubes 7 which are bent around the discharge end of the throat member 4 to permit the discharge of gases from the cyclone furnace therebetween. The cylindrical and conical walls of the combustion chamber are lined with refractory covered water tubes 3, as is also the throat member, which are connected in any suitable manner into the fluid circulation system of the associated steam boiler.

The secondary combustion chamber is provided with a refractory bottom extending to a point over a header 6 connected to the wall tubes 7. By bending individual tubes 7, one or more openings 8 are formed, through which the slag flows into a closed lateral chamber 10, which is bounded by refractory masonry on its sides and by a slag remover 9 on its bottom. Into this chamber 10 there also flows the excess slag which discharges from the combustion chamber through a slag opening 11 positioned in the bottom of the cylindrical section 1 at its point of juncture with the frusto-conical section 2. Through this opening 11 there will also flow a stream of combustion gases, which traverse the chamber 10 and discharge through the openings 8, into the secondary combustion chamber 5. For protection against reflection the slag remover 9 is protected laterally of the slag inlet openings 12 and 13 thereto by a refractory cover 14.

The raw fuel is supplied from a bunker 15 through a feeder 16, made in the form of a trough-chain-conveyor, and a pipe 17, into a crusher 18, of any suitable type, and falls, through the chute 19, whose end is made in the form of a nozzle, tangentially into the cylindrical section 1 of the cyclone furnace close to the front wall thereof. A conduit 20 supplies combustion air to the chute 19 and inlet 30. A vertical partition 26 in the chute 19 divides the air stream coming from the conduit 20 into a stream which mixes with the downcoming fuel and a second stream which keeps the incoming fuel away from the circumferential wall until the fuel has ignited. Secondary combustion air is supplied in regulable quantities to the combustion chamber through tangentially arranged air nozzles 21, 22, 23, 24 and 25 circumferentially spaced from the fuel inlet 30. An inlet pipe 32 is connected to the end of the frusto-conical section 2 for the introduction of a regulable supply of recirculated combustion gases in the manner disclosed in said copending Sifrin application, is desired.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Apparatus for burning a slag-forming fuel which comprises a substantially cylindrical furnace chamber section arranged with its axis forwardly inclined and having a gas outlet throat projecting into the forward end thereof, means for introducing a combustible mixture of air and slag-forming fuel in suspension tangentially into said furnace chamber around said gas outlet throat, a slag outlet opening to said furnace chamber rearwardly of said gas outlet throat, a sealed slag collecting chamber arranged to receive the discharge from said slag outlet, a secondary combustion chamber at the discharge end of said gas outlet throat, and a slag outlet from said secondary combustion chamber to said slag collecting chamber.

2. Apparatus for burning a slag-forming fuel which comprises a substantially cylindrical furnace chamber section arranged with its axis forwardly inclined and having a gas outlet throat projecting into the forward end thereof, means for introducing a combustible mixture of air and slag-forming fuel in suspension tangentially into said furnace chamber around said gas outlet throat, means forming an elongated conical section of said furnace chamber at the end thereof opposite said gas outlet throat, a slag outlet opening to said furnace chamber adjacent the juncture of said cylindrical and conical sections, a sealed slag collecting chamber arranged to receive the discharge from said slag outlet, a secondary combustion chamber at the discharge end of said gas outlet throat, and a slag outlet from said secondary combustion chamber to said slag collecting chamber.

References Cited in the file of this patent

UNITED STATES PATENTS

| | | |
|---|---|---|
| 1,180,792 | Norrman | Apr. 25, 1916 |
| 1,657,725 | Schutz | Jan. 31, 1928 |
| 2,357,301 | Bailey et al. | Sept. 5, 1944 |
| 2,395,103 | Clausen et al. | Feb. 19, 1946 |
| 2,468,415 | Stair | Apr. 26, 1949 |
| 2,527,934 | Jefferies | Oct. 31, 1950 |

FOREIGN PATENTS

| | | |
|---|---|---|
| 16,270 | Australia | Oct. 17, 1928 |
| 408,850 | Germany | Jan. 27, 1925 |
| 305,270 | Great Britain | Feb. 1, 1929 |